June 20, 1944. P. E. McMURRY 2,351,775
GATE VALVE
Filed May 15, 1942 2 Sheets-Sheet 1

INVENTOR.
Paul E. McMurry
BY Thos. E. Scofield
ATTORNEY.

June 20, 1944.   P. E. McMURRY   2,351,775
GATE VALVE
Filed May 15, 1942   2 Sheets-Sheet 2

INVENTOR.
Paul E. McMurry
BY Thos. E. Scofield
ATTORNEY

Patented June 20, 1944

2,351,775

UNITED STATES PATENT OFFICE 2,351,775

GATE VALVE

Paul E. McMurry, St. Joseph, Mo., assignor to forty per cent to Albert F. Walter, St. Joseph, Mo.

Application May 15, 1942, Serial No. 443,063

6 Claims. (Cl. 277—54)

My invention relates broadly to new and useful improvements in gate valves and more particularly to a gate valve that may be mounted in a pipe line and that will relieve excessive pressures in the line when the valve is closed.

One application of a valve embodying my invention is in a gasoline delivery line leading from a gasoline storage tank to a loading dock. When gasoline is transferred from a storage tank to a truck, it passes through an exposed pipe line where pressures exist of approximately two to ten pounds per square inch. After the truck has been filled, two gate valves in the pipe line are closed. One valve is at the discharge end of the line and the other is adjacent the storage tank. The valve adjacent the tank is closed so that a leak in the pipe line will not permit all of the gasoline to drain from the storage tank.

After the two valves are closed, a quantity of gasoline is trapped in the pipe line between the valves. During the day, the sun heats the trapped gasoline and causes pressure to build up in the line. I have found this pressure to be approximately 75 pounds per degree rise in the temperature of the gasoline. When the pressure becomes sufficiently high, one of the valves usually fails.

Fluid in the line enters the bonnets of the gate valves when the valves are open. Upon closing of the valves, this fluid is trapped in the bonnets. If the bonnet is exposed to the sun, expansion of the trapped fluid frequently cracks either the bonnet or the valve body.

An important object of my invention, therefore, is to provide a gate valve that will form a fluid-tight seal in a delivery line, which includes a gate disk uniquely constructed to relieve pressure in all parts of the valve and in the delivery line where expansion of trapped fluids might otherwise cause the valve to fail.

Figure 1:
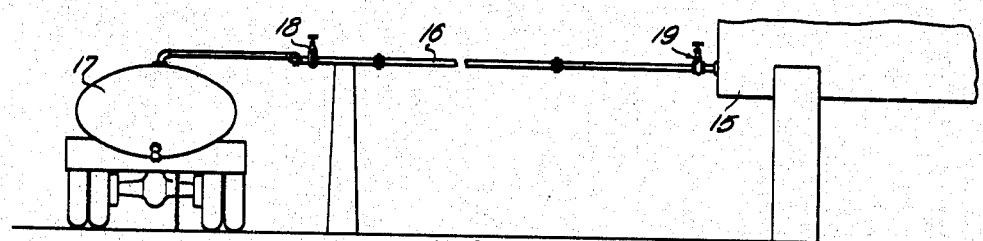
Figure 2:
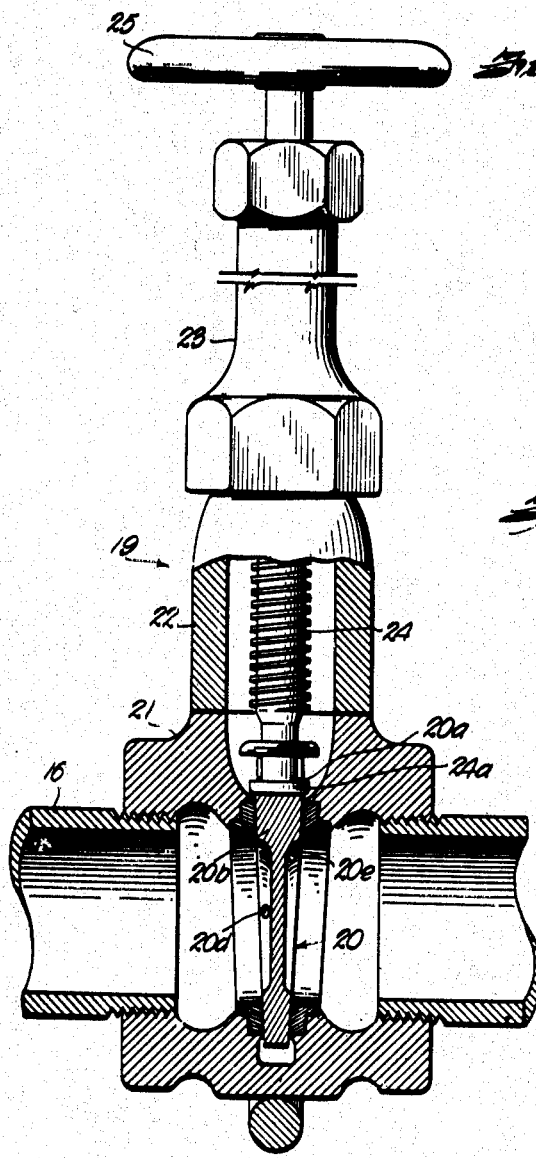
Figure 3:
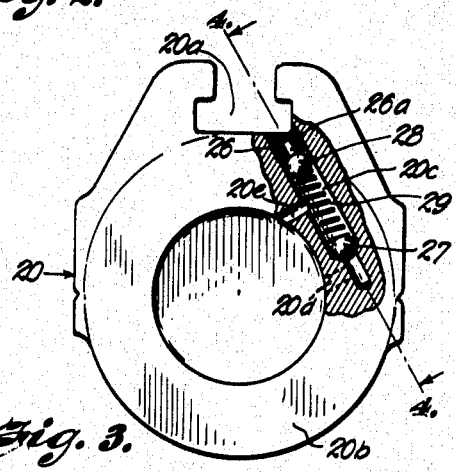
Figure 4:
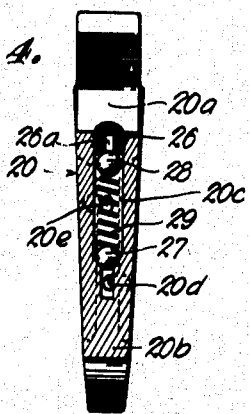
Figure 5:
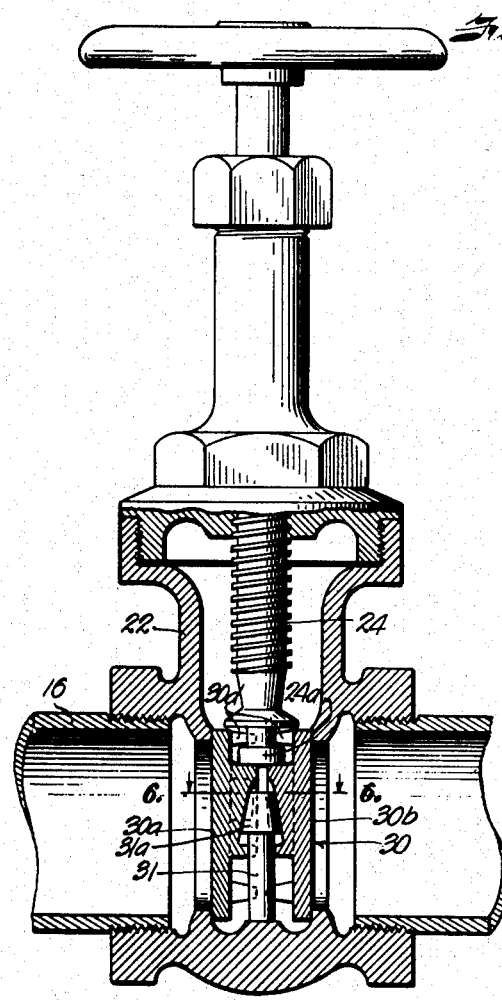
Figure 6:
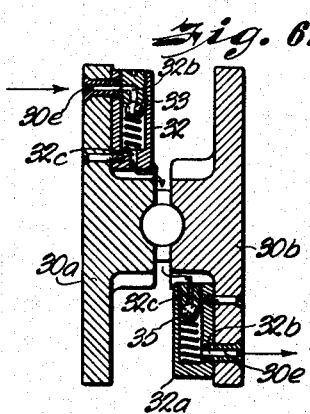
Figure 10:
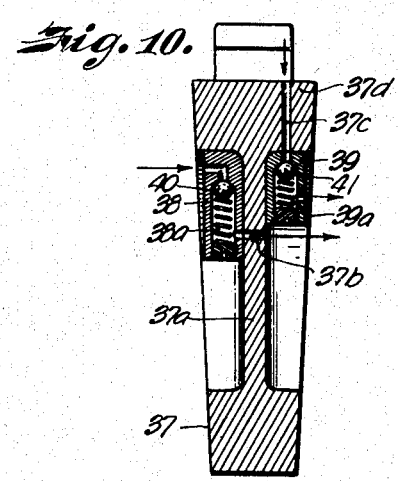
Figures 7, 8:
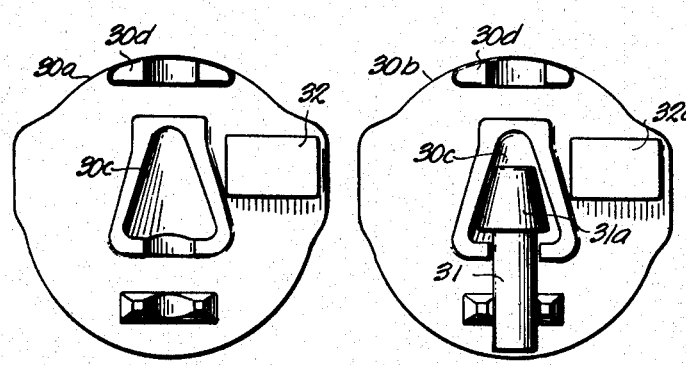
Figure 9:
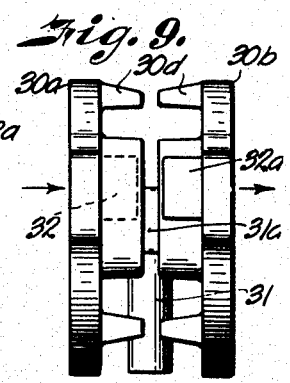

In the drawings forming a part of this specification, wherein like numerals are employed to designate like parts throughout the same, Fig. 1 is an elevational view illustrating the manner in which a valve embodying my invention is incorporated in a pipe for the delivery of motor fuel from a tank to a truck loading dock, Fig. 2 is a side elevation of the valve showing the same connected to a fragmentary portion of the pipe line, parts of the valve being broken away for clearness of illustration, Fig. 3 is a front elevation of a gate disk showing my pressure relief means mounted therein so as to relieve pressure in the line and in the valve bonnet, Fig. 4 is a sectional view taken on the line 4—4 of Fig. 3, Fig. 5 is a view similar to Fig. 2, but showing a modified type of gate disk, Fig. 6 is a transverse sectional view through the gate disk taken on the line 6—6 of Fig. 5, Fig. 7 is an inside face view of one half of the gate shown in Fig. 6, Fig. 8 is an inside face view of the other half of the gate shown at the right in Fig. 6, Fig. 9 is an edge elevational view of the valve gate shown in Figs. 5 to 8 inclusive, and Fig. 10 is a vertical sectional view of still another modification of a valve gate, embodying my invention.

Referring now to Figs. 1 through 4, wherein is shown the preferred embodiment, the numeral 15 designates a storage tank for gasoline. Gasoline flows from the tank 15 through a delivery line 16 and is discharged into a truck 17. A conventional gate valve 18 is inserted at the discharge end of the delivery line, and a gate valve 19 embodying my invention is inserted in the line adjacent storage tank 15. After the truck 17 has been filled, valve 18 is closed. Inasmuch as storage tank 15 may be a considerable distance from the loading dock, it is generally considered good practice to also close gate valve 19 so that a leak in the delivery line 16 will not drain all of the gasoline from the storage tank. The delivery line is usually uninsulated and exposed to variations in temperature. Pressure builds up in the delivery line between valves 18 and 19 due to expansion of the trapped fluid caused by a rise in temperature. Valve 19 is constructed to relieve this pressure by permitting fluid in the delivery line to discharge back into the storage tank. There is little change of temperature in the fluid within storage tank 15 because of the large dimensions of the tank and the large quantity of fluid therein.

Gate valve 19 is shown on an enlarged scale in Fig. 2. All parts of the valve, except the gate disk 20 are conventional. A valve body 21 is surmounted by a bonnet 22 and the bonnet is closed by a cap 23. A screw threaded valve stem 24 manually rotated by hand wheel 25 extends through cap 23 and bonnet 22 and is detachably connected to the valve disk 20. A stuffing nut threaded on cap 23 provides a fluid tight connection between the cap and valve stem. The lower end of valve stem 24 has an enlarged annular collar 24a which fits loosely within the recess 20a of the gate disk 20. Rotation of hand wheel 25 in one direction raises the gate disk 20 into the bonnet and rotation of hand wheel 25 in the opposite direction lowers the gate disk to the seated position shown in Fig. 2.

A passage 20c is drilled at an angle from recess 20a into the relatively thick portion 20b of the disk, shown in Fig. 2. A lateral duct 20d connects the lower end of passage 20c with the interior of the valve body to which the delivery pipe 16 is connected. A second duct 20e communicates with the middle of passage 20c and with the interior of the valve body connected to the tank 15. The upper end of passage 20c is closed by a removable plug 26 which has a duct 26a through which fluid under excess pressure in the bonnet may flow. Ball valves 27 and 28 in passage 20c are urged to close ducts 20d and 26a, respectively, by a coil spring 29.

My construction relieves fluid pressure in the bonnet and thus prevents failure of the valve. When the pressure in the bonnet becomes excessive, it will unseat ball valve 28 so that fluid flows through duct 26a, passage 20e and discharges into the tank 15 through lateral duct 20e. As soon as the pressure in the bonnet is sufficiently relieved, spring 29 again seats valve 28.

My construction also relieves pressure in the delivery line 16. When pressure in the line becomes excessive, ball valve 27 is unseated so that fluid may enter passage 20c through lateral duct 20d and discharge into tank 15 through lateral duct 20e. As soon as the line pressure is sufficiently relieved, spring 29 will seat ball valve 27.

In a valve construction, there are usually only two places in which sufficiently high pressures are developed to rupture the valve body. One of these is in the pipe itself and the other is the valve bonnet. It is apparent that I have provided means for relieving pressure, both in the line and bonnet and for returning the expanding fluid to the storage tank.

Referring now to Figs. 5 through 9 wherein is shown a double plate type of gate disk 30. The inner surfaces of plates 30a and 30b have essentially triangular pockets 30c which retain the conical head 31a of a stem 31. The sides of pockets 30c are upwardly convergent. When the gate is lowered to close the valve, stem 31 abuts against a boss in the valve body and urges the head 31a upwardly against the inclined sides of the pockets. This action preses the plates outwardly against their seats. The plates 30a and 30b have collars 30d which loosely embrace stem 24 above the annular collar 24a. This type of gate valve is conventional in the art. When the gate is in a raised position, fluid enters the bonnet 22 and when the gate is lowered this fluid is trapped in the bonnet and in the space between plates 30a and 30b.

In order to relieve pressure in pipe line 16 and in bonnet 22 when a valve of this type is used adjacent tank 15, I provide ports 30e in the plates. Flow of fluid through these ports is controlled by valves within tubular housings 32 and 32a mounted on the inner sides of the plates 30a and 30b, respectively.

Ducts 32b in one end of the housings communicate with ports 30e. Ducts 32c in the opposite ends of the housings open into the space between the plates. Plate 30a is on the delivery pipe side of the valve and plate 30b is on the storage tank side of the valve. A spring loaded ball valve 33 in housing 32 normally closes duct 32b. A spring loaded ball valve 35 in the housing 32 normally closes duct 32c. Thus, fluid under excessive pressure in delivery line 16 enters the space between plates 30a and 30b by unseating ball valve 33. Fluid under excessive pressure in bonnet 32 and between plates 30a and 30b unseats ball valve 35 and discharges into storage tank 15. By mounting the pressure relief valves on the inner faces of plates 30a and 30b, the operation of the gate is unaffected. It is apparent that excessive pressure in either the delivery line 16 or bonnet 22 will be quickly relieved. However, when the gate valve is closed, fluid in the storage tank 15 is prevented from entering the delivery line 16.

Another type of gate disk is shown in Fig. 10. This disk, designated by the numeral 37, is identical with disk 20 except that the central web portion 37a is much thinner having relatively deep recesses on both sides thereof. A valve 38 controls the flow of fluid through the duct 37b in web 37a and a valve 39 controls the flow of fluid through duct 37c extending radially through the relatively thick outer portion 37d of the gate disk. A passage 38a through valve 38 registers with port 37b and is normally closed by a spring loaded valve 40. A passage 39a in valve 39 registers with port 37c and is normally closed by a spring loaded ball valve 41. The gate is positioned in the valve so that valve member 38 is on the side connected to the delivery line 16 and valve member 39 is on the side connected to storage tank 15.

Excessive pressure in the pipe 16 will unseat valve 40 and permit fluid to flow through passage 38a and duct 37b into the storage tank. Excessive pressure in the bonnet 22 will unseat ball valve 41 and permit fluid to flow through duct 37 and passage 39a also into the storage tank.

It may thus be seen that I have accomplished the objects of my invention. I have provided a gate valve that operates in the conventional manner and which is uniquely constructed to relieve excessive pressures both in the delivery line and in the bonnet of the valve. My construction will obviate breakage of the valve due to expansion of fluid trapped either in the delivery line or in the valve.

Having thus described my invention, I claim:

1. In a gate valve of the type comprising a body provided with a fluid passage having inlet and outlet ports, a bonnet surmounting the body and communicating with the passage, and a gate movable across the passage between the inlet and outlet ports so that fluid is trapped in the bonnet when the gate is closed, the improvement comprising a pressure relief means carried by the gate for relieving pressure from one port, and a second pressure relief means for relieving pressure from the bonnet to said other port.

2. In a gate valve of the type comprising a body provided with a fluid passage having inlet and outlet ports, a bonnet surmounting the body and communicating with the passage, and a gate movable across the passage so that fluid is trapped in the bonnet when the gate is closed, the improvement comprising a pressure relief means carried by the gate, said means having passage means through the disk for relieving pressure from one port to the other port, and a second passage means for relieving pressure from the bonnet to said other port.

3. In a gate valve of the type comprising a body provided with a fluid passage having inlet and outlet ports, a bonnet surmounting the body and communicating with the passage, and a gate movable across the passage so that fluid is trapped in the bonnet when the gate is closed, the improvement comprising a pressure relief means carried by the gate, said means including a duct which opens into the bonnet and through each side of the gate, a valve in the duct adapted to be opened by pressure in the bonnet, and a second valve in the duct adapted to be opened by pressure in the passage at one side of the gate.

4. In a gate valve of the type comprising a body provided with a fluid passage having inlet and outlet ports, a bonnet surmounting the body and communicating with the passage, and a gate movable across the passage so that fluid is trapped in the bonnet when the gate is closed, the improvement comprising a pressure relief means carried by the gate, said means including a chamber in the gate, a duct connecting the chamber with the bonnet, a duct connecting the chamber with one side of the gate, valves normally closing said ducts and a normally open duct connecting the chamber between the valves with the other side of the gate.

5. In a gate valve of the type comprising a body provided with a fluid passage, spaced disks movable across the passage and forming a valve gate, and a bonnet communicating with the space between the disks, the improvement comprising a duct through each of the disks, and valves controlling the ducts, one of the valves opening in response to pressure at one side of the gate to discharge the pressure into the space between the disks and the other of the valves opening in response to pressure in the space between the disks to discharge the pressure to the other side of the gate.

6. In a gate valve of the type having a body provided with a fluid passage having inlet and outlet ports, a bonnet surmounting the body and communicating with the passage, and a gate movable across the passage so that fluid is trapped in the bonnet when the gate is closed, the improvement comprising a duct extending through the gate, a valve in said duct adapted to relieve pressure from one side of the gate to the other side of the gate, a second duct in the gate connecting the bonnet with said other side of the gate, and a valve in the second duct adapted to relieve pressure from the bonnet to said other side of the gate.

PAUL E. McMURRY.